United States Patent
Gygrynuk

[15] 3,697,123
[45] Oct. 10, 1972

[54] MOBILE VEHICLE TESTING APPARATUS

[72] Inventor: Walter Gygrynuk, 45 Millwright Drive, Old Mill Manor, Newark, Del. 19711

[22] Filed: March 24, 1970

[21] Appl. No.: 22,166

[52] U.S. Cl..................................296/24, 135/10
[51] Int. Cl..................................B60r 11/00
[58] Field of Search..............296/1, 24, 95; 135/10

[56] References Cited

UNITED STATES PATENTS

| | | | |
|---|---|---|---|
| 2,358,446 | 9/1944 | Couse | 296/24 |
| 3,095,034 | 6/1963 | Francis | 246/95 |

FOREIGN PATENTS OR APPLICATIONS

| | | | |
|---|---|---|---|
| 602,756 | 3/1960 | Italy | 296/24 |

Primary Examiner—Philip Goodman
Attorney—Connolly and Hutz

[57] ABSTRACT

A mobile vehicle testing apparatus includes a van-type vehicle having means in its body for testing the electrical performance of a motor. A power source for these means is also mounted in the body as well as storage facilities for replacement parts. The means are exposed by the opening of a door on the vehicle for ready accessibility with respect to the vehicle being tested.

13 Claims, 8 Drawing Figures

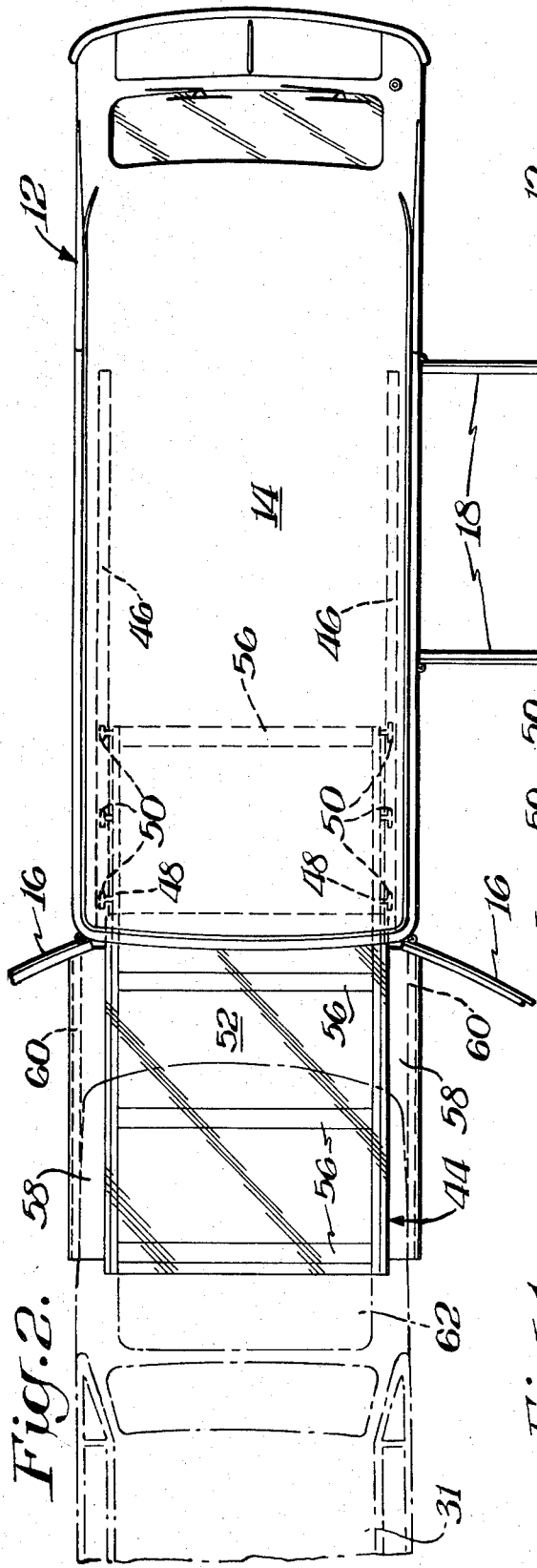
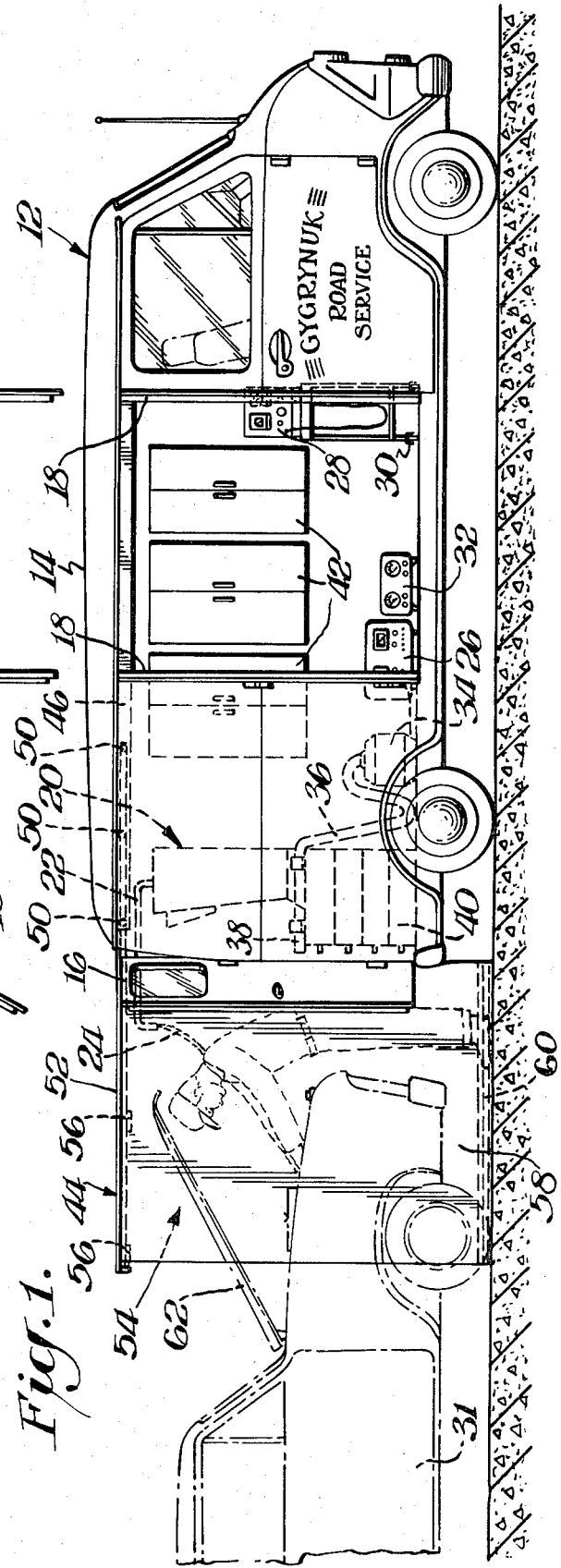

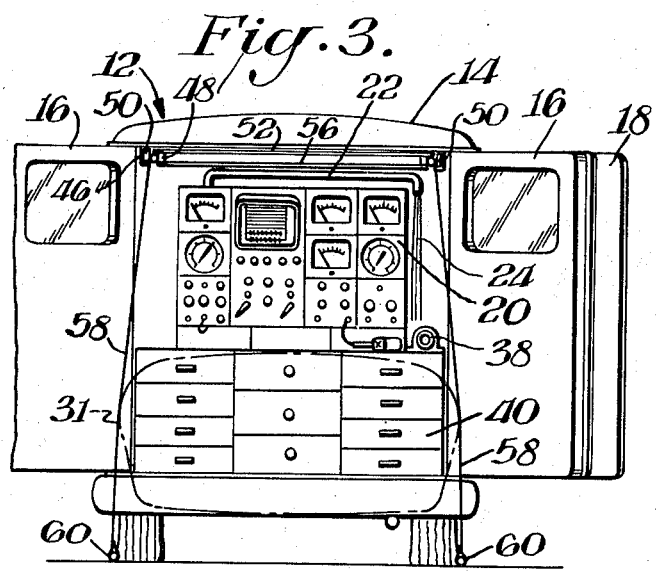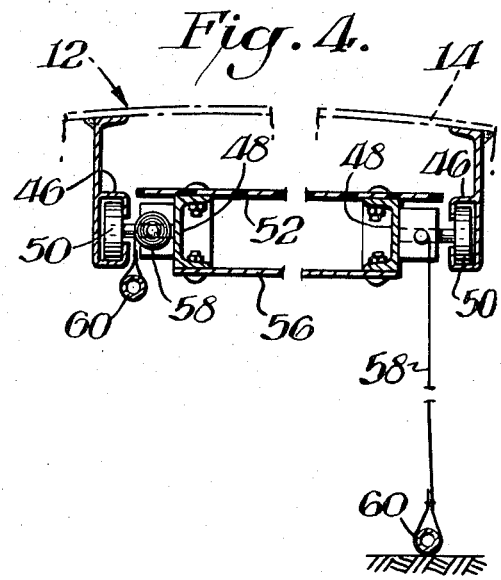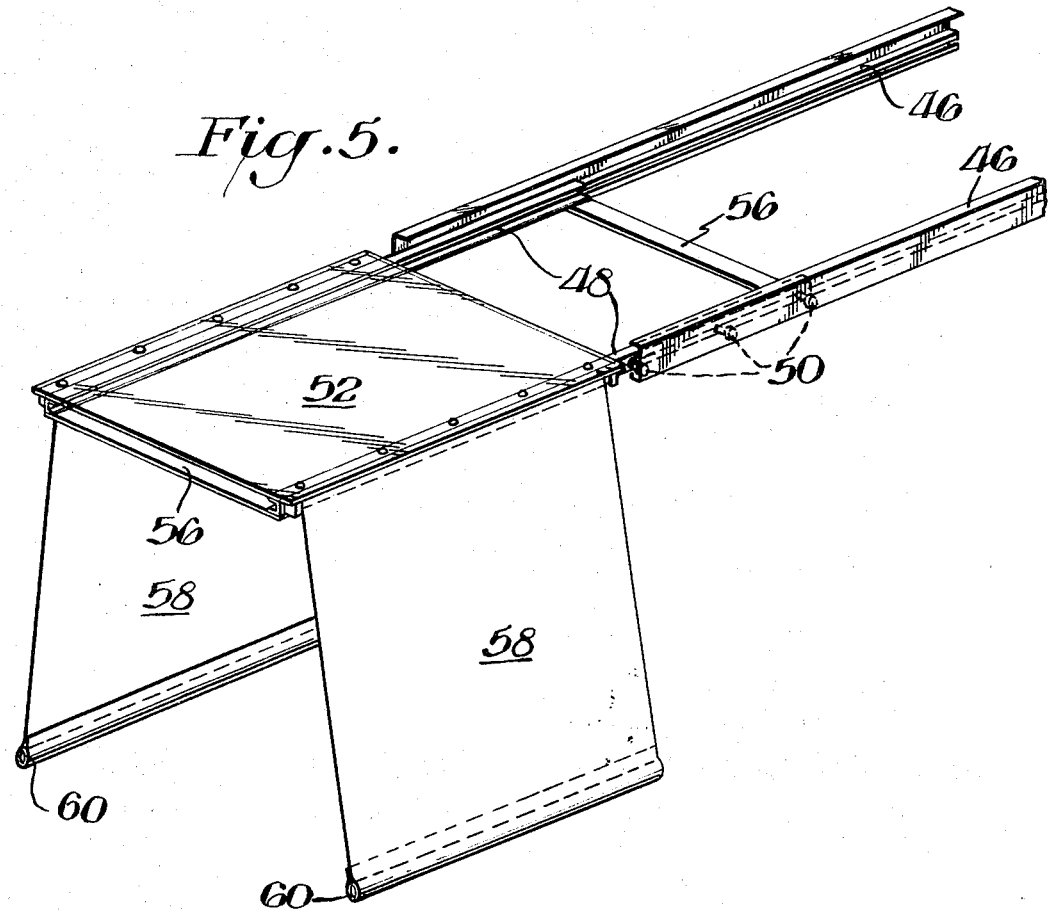

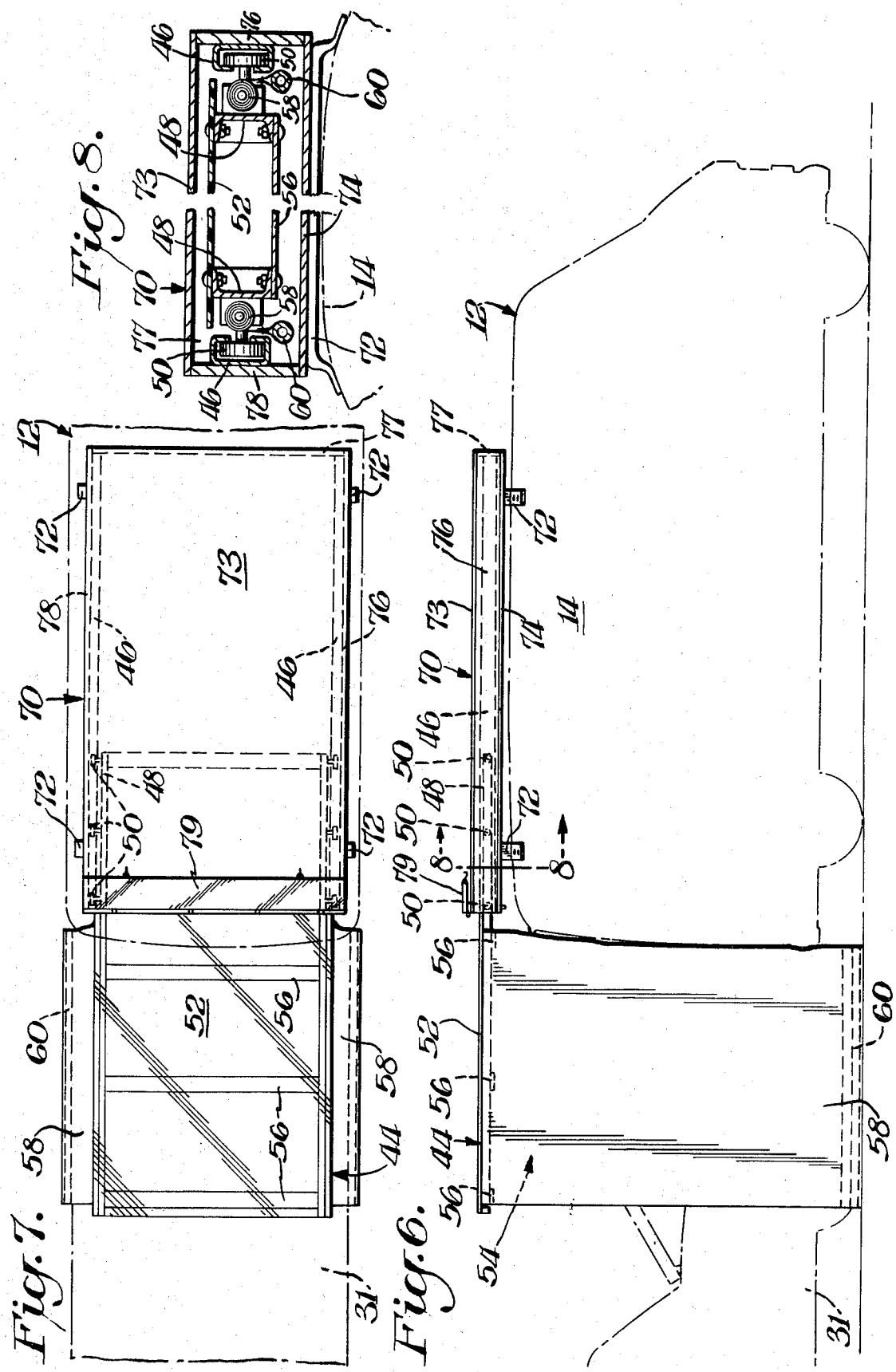

MOBILE VEHICLE TESTING APPARATUS

BACKGROUND OF INVENTION

Devices exist for completely testing various parts of motor vehicles such as tune-up equipment as well as various means for testing the electrical performance of a vehicle motor or other electronic engine testing means. Conventionally, however, such devices are located in a service station garage and the vehicle to be tested must be brought to the garage even if towing is necessary. Heretofore those skilled in this art never considered making this testing equipment portable. In this respect it was believed necessary to utilize the garage so that the testing equipment and the tested vehicle could be sheltered. Moreover the utilization of the garage was beneficial in that replacement parts were close at hand. Additionally, since such equipment requires a power source, the garage power source was considered necessary.

SUMMARY OF INVENTION

An object of this invention is to provide a mobile vehicle testing apparatus which brings the testing equipment to the vehicle being tested.

A further object of this invention is to provide such an apparatus which has facilities for housing the replacement parts likely to be needed.

A still further object of this invention is to provide such an apparatus which effectively shelters the testing equipment as well as the motor of the tested vehicle.

In accordance with this invention a mobile vehicle testing apparatus includes a van-type vehicle having means in its body for testing the electrical performance of a motor. A power source for these means is also mounted in the body as well as storage facilities for replacement parts. The means are exposed by the opening of a door on the vehicle for ready accessibility with respect to the vehicle being tested.

The apparatus may include a canopy extendable from the vehicle body to shelter the operator and the motor of the vehicle being tested. A further ramification of this invention is the inclusion of heating means to heat the sheltered area.

THE DRAWINGS

FIG. 1 is a side elevation view showing the apparatus of this invention in use;

FIG. 2 is a top plan view of the apparatus shown in FIG. 1;

FIG. 3 is an end elevation view of the apparatus shown in FIG. 1–2;

FIG. 4 is an elevation view partly in section showing details of the canopy of the apparatus shown in FIGS. 1–3;

FIG. 5 is a perspective view showing details of the canopy of FIGS. 1–4;

FIG. 6 is a side elevation view showing an alternate way of mounting the apparatus of this invention;

FIG. 7 is a top plan view of the apparatus shown in FIG. 6; and

FIG. 8 is a cross-sectional view taken along lines 8—8 of FIG. 6 showing details of the canopy of the apparatus shown in FIGS. 6–7.

DETAILED DESCRIPTION

FIGS. 1–2 show a motor vehicle testing apparatus 10 in accordance with this invention. In general the apparatus includes any suitable vehicle such as the van-type truck 12 having a body 14 and openable doors 16 at its end thereof. Side doors 18 are also provided. Mounted within the body of the vehicle is testing equipment which permits a repairman to perform the necessary test on a possibly faulty vehicle without the inconvenience of bringing the tested vehicle to a service station garage as is conventionally done. Although in retrospect this may seem to be a simple expediency, such an expediency is unobvious in that it represents a complete turnabout in thinking for those skilled in the art. In this respect it was always considered necessary to utilize a garage as the hub of service activity and those skilled in the art did not even consider making the testing equipment portable since it had been considered essential to utilize the garage as a shelter for the expensive and delicate testing equipment and for the vehicle being tested, as well as sheltering the serviceman or operator from the elements. With the claimed arrangement, however, the inconvenience to the customer of having the car brought to the service station is completely avoided as well as the frequently attendant towing expenses. Moreover, the invention eliminates the overhead expenses of maintaining a garage.

Any suitable testing equipment may be used in accordance with this invention. For example as illustrated in FIG. 1 the testing equipment includes diagnostic testing equipment 20 for testing the electrical performance of a motor. Since no claim is made to the equipment, per se, a detailed description thereof is not necessary for an understanding of this invention. Such equipment is commercially available for completely testing, for example, the compression system, ignition systems, fuel systems, starting systems, and charging systems of a vehicle and providing complete diagnosis and engine tune-up means. One commercial diagnostic device particularly adaptable to the present invention includes a swivel arm or rigid tubing 22 which carries the electrical leads or wiring 24. The advantages of this will be discussed in greater detail hereinafter.

Body 14 also houses a power source such as 110 volt A.C. self-generator 26 which supplies the electrical power needed by testing or diagnostic device 20. Additionally, an auxiliary testing device 28 for electronic engine testing is also mounted in body 14. As illustrated in FIG. 1 the testing device 28 is mounted on wheels 30 and is thus readily portable. By the opening of side doors 18, testing device 28 may be easily removed from the truck body 14 and transported to the tested vehicle 31.

As also shown in FIG. 1 mounted within body 14 may be any other suitable auxiliary testing equipment such as air-conditioning testing device 32. Moreover, a heater 34 is provided in body 14. Heater 34 includes a flexible tubing 36 having a nozzle 38 for directing heat into a sheltered area, as is discussed in greater detail hereinafter.

In practice of the invention a driver of the mobile testing vehicle would know in advance the type of motors or vehicles scheduled to be tested. Accordingly, based upon this knowledge and experience, the driver would realize the type of replacement parts which he might expect would be required for any particular job. Thus, the van-type vehicle 12 includes storage facilities for these replacement parts. As illustrated for example in FIG. 1 a cabinet 40 is mounted under diagnostic equipment 20 and may be utilized for including the expected replacement parts in the various drawers therein. Additionally, further storage facilities 42 are provided which are accessible through side doors 18. These storage cabinets may be utilized for holding the necessary tools. Obviously the cabinets 40 and 42 may be used interchangeably for holding tools and/or parts or any other desired components.

A particularly advantageous feature of this invention is the inclusion of means for creating a shelter for the operator or serviceman and for the engine of the vehicle being tested as well as for the testing equipment. This shelter generally includes a canopy 44 which as illustrated in FIGS. 3–5 comprises a pair of tracks 46 secured within and adjacent to the top of the vehicle body 14. Slidably mounted within tracks 46 are bars or beams which move by means of wheels or rollers 50. A sheet of protective material 52 is secured between the bars 48. This material may be of any suitable fabric such as white translucent fiberglass or of the type of material conventionally used in tents or camping equipment. When beams 48 are extended from tracks 46, sheet 52 forms the top layer of the shelter which is generally indicated at 54 in FIG. 1. As more clearly shown in FIGS. 4 and 5 spaced horizontal supports 56 are provided between beams 48 to provide rigidity and assure the proper relative position thereof. Mounted on the sides of beams 48 are extensible shade elements 58. Advantageously, elements 58 may be similar to conventional window shades in that the shades may be pulled downwardly the desired amount and rewound by means of internal spring or recoil mechanism as is conventional in ordinary window shades. Shade elements 58 are also provided with bars 60 to weight down the end thereof and maintain the shade in contact with the ground so as not to be blown about by for example the wind.

In the stored condition, beams 48 are completely telescoped in the truck body 14. During use, the operator opens doors 16 and pulls forward on the canopy 44 to withdraw it from body 14. The end brace or support 58 serves as a convenient handle in this respect. With the canopy fully extended curtains 58 are then pulled downwardly the desired amount to create shelter 54.

As shown in FIG. 1 when the canopy is thus extended and the side shade elements 58 drawn downward, the canopy forms in conjunction with the truck body 14 and the hood 62 of the tested vehicle 31 this relatively closed sheltered area 54. Thus the operator may service the vehicle in a sheltered environment and because of the inclusion of heater 34 this sheltered area may also be heated. By the utilization of the specific type of diagnostic equipment 20 illustrated herein, safety to the operator is also maximized with the inclusion of swivel arm 22 so that the electrical wiring 24 is not disposed on the ground where the wiring may be damaged or where the operator may trip over the wiring. Because van trucks may vary dimensionally, as to inside height clearance and roof curvature, a significant clearance for canopy 44 and the necessary test equipment may not always exist. If this condition should result, an alternate method for mounting canopy 44 has been devised as shown in FIGS. 6–8 and described hereinafter.

The canopy 44 is mounted in a protective box-like structure 70 which is attached to the roof of the truck 12, using support brackets 72. The attachment of the support brackets to the roof may be by riveting or welding. Alternatively housing or structure 70 may be detachably mounted as is well known with, for example, racks which include clips detachably connected to the vehicle. Box-like structure 70 includes a top sheet 73 and a bottom sheet 74 that are spaced apart by two upstanding side members 76 and 78 and two upstanding end members 77 and 79. One end member 79 is not permanently attached but hinged to top 73, thereby to allow for free movement of canopy 44 into and out of the structure 70 along tracks 46 as shown in FIGS. 6–8. The hinged end 79 also protects the stored canopy 44 from the outside elements. The structure 70 is preferably constructed of wood, however, molded reinforced fiberglass or fabrication metal methods could also be used.

The canopy structure and operation is substantially the same as previously described and illustrated, except as noted, guide tracks 46 are attached to side members 76 and 78 of structure 70 rather than being suspended from roof 14.

As is apparent from the foregoing description the vehicle testing apparatus 10 thus provides a mobile unit which can be brought to the home or place of business at the request of the owner of the vehicle and be repaired without the inconvenience normally attendant with prior art practices. Moreover, this mobile unit 10 permits a thorough testing of the apparatus under conditions wherein the serviceman is sheltered from the elements as well as the tested vehicle and testing equipment being sheltered.

What is claimed is:

1. A mobile vehicle testing apparatus comprising a van-type vehicle having a body, vehicle motor diagnosis testing means in said body, a power source mounted in said body and connected to said testing means, storage means in said body for housing replacement parts for the vehicle to be tested, openable door means on said body, said testing means being disposed adjacent said door means whereby the opening of said door means causes said testing means to be accessible for operation thereof without removal from said vehicle body, canopy means connected to said body for sheltering the operator of said testing means and the motor of the vehicle being tested, said canopy means including a pair of parallel guide rails mounted to the top of said vehicle body adjacent said door means, a support beam slidably mounted in each guide rail for moving directly outwardly away from said vehicle, and sheltering material spanning the support beams and extendable downwardly from the sides of said support beams.

2. The apparatus of claim 1 including heater means in said body for directing heat through said door means into the area sheltered by said canopy means.

3. A mobile vehicle testing apparatus comprising a van-type vehicle having a body, vehicle motor diagnosis testing means in said body, a power source mounted in said body and connected to said testing means, storage means in said body for housing replacement parts for the vehicle to be tested, openable door means on said body, said testing means being disposed adjacent said door means whereby the opening of said door means causes said testing means to be accessible for operation thereof without removal from said vehicle body, canopy means connected to said body for sheltering the operator of said testing means and the motor of the vehicle being tested, heater means in said body for directing heat through said door means into the area sheltered by said canopy means, said heater means being mounted in said body with said testing means being between said door means and said heater means, and said heater means including a flexible tubing and a nozzle for extending into the opening of said door means.

4. The apparatus of claim 3 wherein said canopy means is connected to said body and extensible therefrom.

5. The apparatus of claim 4 wherein said canopy means includes a pair of guide rails fixed adjacent to the top of said body, support beams slidably mounted on said guide rails, and sheltering material secured to said beams.

6. A mobile vehicle testing apparatus comprising a van-type vehicle having a body, vehicle motor diagnosis testing means in said body, a power source mounted in said body and connected to said testing means, storage means in said body for housing replacement parts for the vehicle to be tested, openable door means on said body, said testing means being disposed adjacent said door means whereby the opening of said door means causes said testing means to be accessible for operation thereof without removal from said vehicle body, canopy means connected to said body for sheltering the operator of said testing means and the motor of the vehicle being tested, said canopy means being connected to said body and extensible therefrom, said canopy means including a pair of guide rails fixed adjacent to the top of said body, support beams slidably mounted on said guide rails, and sheltering material secured to said beams, said sheltering material includes a sheet of material connected between said beams, and a rollable curtain on each of said beams for extending downwardly toward the ground.

7. The apparatus of claim 6 wherein weights are connected to the bottom of each rollable curtain, and each curtain including spring means for facilitating the retractability of the curtain.

8. The apparatus of claim 7 wherein said guide rails are disposed in said body and suspended from the roof of said body.

9. The apparatus of claim 7 wherein said canopy is mounted within and extensible from a closed canopy housing, said canopy housing being mounted on the roof of said body, said rails being secured to the side walls of said housing, and one end wall of said housing being openable to permit said canopy to be extended therefrom.

10. The apparatus of claim 7 wherein said testing means includes a housing for mounting the testing components, a rigid tubing connected to and extending upwardly from said housing, the electrical wiring for said testing means being disposed in said tubing whereby said wiring is elevated, and said tubing being swivably connected to said housing.

11. The apparatus of claim 8 wherein heater means is disposed in said body for directing heat through said door means into the area sheltered by said canopy means, said heater means being mounted in said body with said testing means being between said door means and said heater means, and said heater means including a flexible tubing and nozzle for extending into the opening of said door means.

12. The apparatus of claim 9 wherein storage means are mounted in said body juxtaposed to said testing means and are accessible upon the opening of said door means.

13. The apparatus of claim 10 wherein said body includes side doors, storage compartments being in said body and accessible upon the opening of said side doors, and auxiliary testing equipment being in said body and accessible upon the opening of said side doors.

* * * * *